June 26, 1956 J. G. GREEN 2,752,115
FOLDING TRIPOD FISHING POLE STAND
Filed Sept. 16, 1953
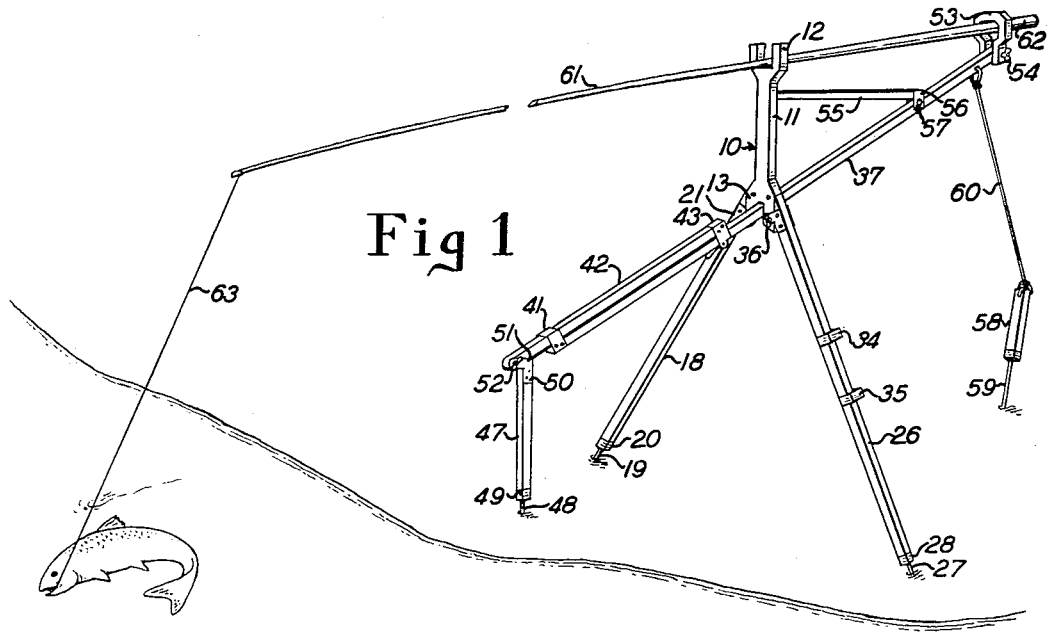
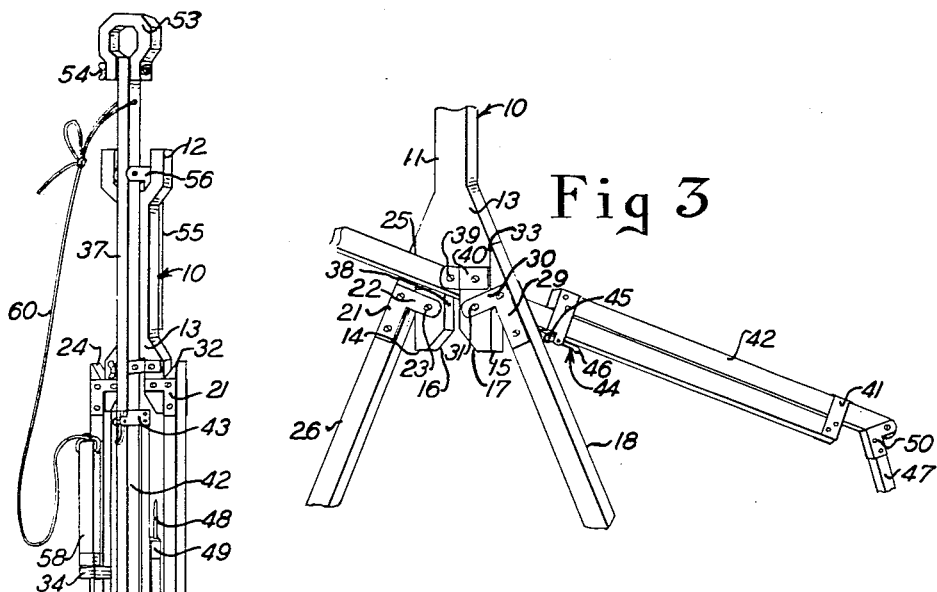
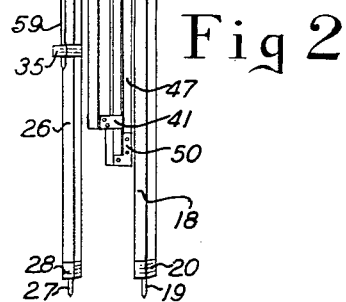
INVENTOR
JOHN G. GREEN
BY
*Jacoby & Jacoby*
ATTORNEYS United States Patent Office 2,752,115
Patented June 26, 1956

2,752,115
FOLDING TRIPOD FISHING POLE STAND

John G. Green, Greensboro, N. C.

Application September 16, 1953, Serial No. 380,520

5 Claims. (Cl. 248—46)

This invention relates to sporting equipment and more particularly to a collapsible or folding stand or support for a fishing rod.

It is contemplated that the apparatus of this invention will be constructed of relatively lightweight material such as wood or a suitable metal and the same is so constructed as to permit folding into a relatively small package for convenience in transportation and yet provides a device which may be erected and placed in operation in a matter of seconds.

Heretofore, numerous devices of this nature have been proposed and utilized, but many of these were relatively heavy and complicated and also were not sufficiently stable to prevent inadvertent overturning or collapse when accidentally hit or as a result of a relatively strong wind.

It is therefore an object of this invention to provide a light weight foldable fishing rod support which may be folded for transportation and erected and placed in operation with a minimum of effort and without requiring the use of tools.

A further object of the invention is the provision of a folding fishing rod support including three legs for engaging the ground and a ground engaging spike connected to the support by flexible means in order to prevent inadvertent overturning of the device.

A still further object of the invention is the provision of a foldable fishing rod support which if desired, may be quickly and conveniently disassembled without requiring the use of tools.

Another object of the invention is the provision of a foldable lightweight fishing rod support which may be firmly locked in erected position by the manipulation of a single latch means.

A further object of the invention is the provision of a lightweight foldable fishing rod support provided with three ground engaging legs and in which one leg is adjustable as to length and also as to angularity with relation to the ground.

A still further object of the invention is the provision of a lightweight foldable fishing rod support which may be conveniently and economically constructed from readily available lightweight materials and including means for receiving and supporting a fishing rod, which rod may be quickly and easily removed from the support in the event of a strike.

Further objects and advantages of the invention will be apparent from the following description taken in conjunction with the accompanying drawings wherein:

Fig. 1 is a perspective view showing the fishing rod support of this invention in erected condition and in place for holding or supporting a fishing rod while fishing;

Fig. 2, a perspective view of the fishing rod support of this invention in folded or collapsed condition; and Fig. 3, a fragmentary perspective view showing details of the adjustable leg and the manner of attaching all of the legs to the body of the device.

With continued reference to the drawing there is shown a foldable fishing rod support comprising a body 10 having an elongated central portion 11 terminating in a notched upper end 12 and having a bifurcated lower end 13, the arms 14 and 15 of which are provided with beveled inner surfaces 16 and 17 respectively, the purpose of which will be presently described.

A leg 18 is provided at its lower end with a ground engaging spike 19 and a ferrule 20 may surround the lower end of the leg 18 in order to prevent damage thereto. The upper end of leg 18 is provided with an angular hinge member 21 having an ear 22 pivotally mounted at 23 on the arm 14 of the bifurcated portion 13. The upper end 24 of leg 18 is beveled in such a manner as to abut the side surface 25 of the bifurcated portion 13 in order to support the leg 18 at an angle as shown in Figs. 1 and 3.

A second leg 26 is provided at its lower end with a ground engaging spike 27 and the lower end of leg 26 may if desired, be protected by a ferrule 28. The upper end of leg 26 is provided with an angular hinge member 29 having an ear 30 pivotally connected at 31 to the arm 15 of bifurcated portion 13. The upper end of leg 26 is beveled as at 32 in order to abut the side surface 33 of the bifurcated portion 13 and support the leg 26 in erected position as shown in Figs. 1 and 3. Leg 26 is also provided intermediate the length thereof, with spaced blocks 34 and 35 having apertures therein, the purpose of which will be presently described. If desired, the hinges 21 and 29 may be secured to the arms 14 and 15 of the bifurcated portions 13 by bolts and wing nuts 36, in order to permit convenient disassembly of the legs 18 and 26 from the body 10.

An elongated bar 37 extends through the slot 38 provided by the arms 14 and 15 of the bifurcated portion 13 and bar 37 is pivotally secured at 39 to brackets 40, secured to the bifurcated portion 13 of the body 10. In order to adjust the length of bar 37 there is provided at one end thereof, a strap 41 of metal or other suitable material and slidably received within this strap, is an extension bar 42. The upper end of extension bar 42 is provided with a strap 43 of metal or other suitable material extending on each side of the bar 37 and pivotally mounted on the strap 43 and engaging the lower surface of bar 37 is a clamp member 44, having a cam portion 45 and a finger engaging portion 46 for convenient manipulation of the same. With the clamp member 44 in the position shown in Figs. 1 and 3, the cam 45 tightly engages the surface of bar 37 in order to securely lock the extension bar 42 against sliding movement with relation to the bar 37. When it is desired to adjust the length of bar 37, it is only necessary to release the clamp member 44 by manipulating the finger engaging portion 46 to permit free sliding movement of the extension bar 42, which may be locked in any desired position by returning the clamp member 44 to the position shown in Figs. 1 and 3.

A relatively short foldable leg 47 is provided at its lower end with a ground engaging spike 48 and if desired, the lower end of leg 47 may be provided with a ferrule 49 in order to prevent damage thereto. The upper end of leg 47 is provided with an angle hinge member 50, one ear 51 of which is pivotally secured to the outer end of extension bar 42 by a bolt and wing nut 52, or by any other suitable means.

The opposite end of bar 37 is provided with a loop member 53 which may be pivotally attached to the bar 37 by a bolt and wing nut 54 or by any other suitable means and intermediate the loop 53 and the body 10 there is provided a latch member 55 having an angular hinge 56 pivotally attached by a bolt and wing nut 57 or other suitable means to the bar 37.

A relatively short handle 58 may be provided with a ground engaging spike 59 and the handle 58 may be attached to the bar 37, adjacent to loop 53, by flexible means 60 such as a cord or short length of fishing line.

In operation the foldable fishing rod support of this invention is erected to the position shown in Fig. 1 with the spikes 19 and 27 of legs 18 and 26 embedded in the ground and with the extension bar 42 and leg 47 adjusted in order to permit embedding of the spike 48 in the ground regardless of the contour thereof and in such a manner as to maintain the support in substantially upright position. It should be noted that the brackets 40 are mounted on the same side of the body 10 as the latch member 55 and that when the elongated bar 37 is moved to the position shown in Fig. 1, further movement in a clockwise direction is prevented by engagement of the bar 37 with the upper end of the slot 38 in the bifurcated portion 13. As a result, movement of the latch member 55 to the position shown in Fig. 1 with the end of latch member 55 engaging the surface of the elongated portion 11 of the body 10 on the same side as the brackets 40 will prevent movement of the bar 37 in a counter-clockwise direction and maintain the device in erected condition as shown in Fig. 1.

A fishing pole 61 may be positioned on the support with the butt end 62 extending through the loop member 53 and with an intermediate portion of the pole 61 received in the notched portion 12 of the body 10. A fishing line 63 may extend from the outer end of pole 61 and be supported in suitable position for fishing. In order to prevent inadvertent tipping of the device, the spike 59 on handle 58 may be embedded in the ground with the flexible means 60 taut which will resist forward tilting of the device in the event of a strike. As will be seen, the pole 61 may be quickly and conveniently removed from the support in order to land a fish or for baiting the hook.

Upon completion of fishing in any particular location, the device may be folded into a compact package for transportation as shown in Fig. 2, by pivotally moving the latch 55 to a position substantially at right angles to the bar 37, whereupon the bar 37 may be moved into a position substantially parallel to the body 10. At this time, the latch 55 may be moved to a position extending through the notched upper end 12 and overlapping the body 10 on the opposite side from the bar 37 and by tightening the wing nut 57 this will result in maintaining the bar 37 in folded position with relation to the body 10 as shown in Fig. 3.

The leg 47 may be moved into position parallel with the extension bar 42 and such extension bar may be moved inwardly on the bar 37 to provide the minimum possible length thereof and with the inner end of extension bar 42 received between the beveled ends 16 and 17 of the arms 14 and 15. Likewise, the legs 18 and 26 may be pivotally moved inwardly into substantially parallel relationship, as shown in Fig. 2, and the spike 59 on handle 58 may be disposed in the apertures in blocks 34 and 35 in order to support the same for transportation.

It will be seen that by the above described invention, there has been provided a relatively simple lightweight, foldable fishing rod holder which may be economically constructed of readily available materials such as wood or lightweight metals and which can be folded into a compact package for transportation or erected for fishing in a matter of seconds and which, at the same time, provides a strong and stable support for fishing rod. Furthermore, the device may be firmly clamped in folded condition or may be disassembled at will, without the use of tools.

The stability of the support of this invention is further enhanced by the fact that upon a downward pull on the line 63 a downward force will be exerted on the body 10 to further embed the spikes 19 and 27 in the ground. At the same time, due to the upward force exerted by the pole 61 on the loop 53 the device will tend to pivot forwardly about the spikes 19 and 27 which will result in moving the leg 47 and spike 48 carried thereby downwardly to more firmly embed the same in the ground. Thus the stronger the pull on line 63 the more firmly will the support be anchored to maintain the same in upright position.

It will be obvious to those skilled in the art that various changes may be made in the invention without departing from the spirit and scope thereof and therefore, the invention is not limited by that which is shown in the drawing and described in the specification, but only as indicated in the appended claims.

What is claimed is:

1. A foldable fishing rod support comprising a body having a notch in the upper end and a bifurcated lower end, a leg pivotally mounted on each side of said bifurcated end, said legs extending outwardly and downwardly, an elongated bar pivotally mounted on the lower end of said body and extending between the furcations, a latch member pivotally mounted on said bar and engaging one side of said body to hold said bar in unfolded position, a loop member pivotally mounted on the end of said bar adjacent said latch member, an extension bar slidably mounted on the opposite end of said bar, clamp means to lock said extension bar in adjusted position, a relatively short leg pivotally secured to the end of said extension bar and extending at an angle thereto, ground engaging spikes on said legs, a handle, a ground engaging spike on said handle, a flexible member connecting said handle and said elongated bar and apertured blocks on one of said first mentioned legs for receiving the spike on said handle whereby a fishing rod may be supported in said notch with the butt of said rod extending through said loop member.

2. A foldable fishing rod support comprising a body having a notch in the upper end and a bifurcated lower end, a leg pivotally mounted on each side of said bifurcated end, said legs extending outwardly and downwardly, an elongated bar pivotally mounted on the lower end of said body and extending between the furcations, a latch member pivotally mounted on said bar and engaging one side of said body to hold said bar in unfolded position, a loop member pivotally mounted on the end of said bar adjacent said latch member, an extension bar slidably mounted on the opposite end of said bar, clamp means to lock said extension bar in adjusted position, a relatively short leg pivotally secured to the end of said extension bar and extending at an angle thereto, a handle, a ground engaging spike on said handle, a flexible member connecting said handle and said elongated bar and apertured blocks on one of said first mentioned legs for receiving the spike on said handle whereby a fishing rod may be supported in said notch with the butt of said rod extending through said loop member.

3. A foldable fishing rod support comprising a body having a notch in the upper end and a bifurcated lower end, a leg pivotally mounted on each side of said bifurcated end, said legs extending outwardly and downwardly, an elongated bar pivotally mounted on the lower end of said body and extending between the furcations, a latch member pivotally mounted on said bar and engaging one side of said body to hold said bar in folded position, a loop member pivotally mounted on the end of said bar adjacent said latch member, an extension bar slidably mounted on the opposite end of said bar, clamp means to lock said extension bar in adjusted position, a relatively short leg pivotally secured to the end of said extension bar and extending at an angle thereto, a handle, a ground engaging spike on said handle, a flexible member connecting said handle and said elongated bar and apertured blocks on one of said first mentioned legs for receiving the spike on said handle whereby a fishing rod may be supported in said notch with the butt of said rod extending through said loop member.

4. A foldable fishing rod support comprising a body having a notch in the upper end and a bifurcated lower end, a leg pivotally mounted on each side of said bifurcated end, said legs extending outwardly and downwardly, an elongated bar pivotally mounted on the lower end of said body and extending between the furcations, a latch member pivotally mounted on said bar and engaging one side of said body to hold said bar in unfolded position, a loop member mounted on the end of said bar adjacent said latch member, an extension bar slidably mounted on the opposite end of said bar, means to lock said extension bar in adjusted position, a leg pivotally secured to the end of said extension bar and extending at an angle thereto, a handle, a ground engaging spike on said handle, a flexible member connecting said handle and said elongated bar and means on one of said first mentioned legs for supporting said handle whereby a fishing rod may be supported in said notch with the butt of said rod extending through said loop member.

5. A foldable fishing rod support comprising a body having a notch in the upper end and a bifurcated lower end, a leg pivotally mounted on each side of said bifurcated end, said legs extending outwardly and downwardly, an elongated bar pivotally mounted on the lower end of said body and extending between the furcations, a latch member pivotally mounted on said bar and engaging one side of said body to hold said bar in unfolded position, a loop member mounted on the end of said bar adjacent said latch member, an extension bar slidably mounted on the opposite end of said bar, means to lock said extension bar in adjusted position, a leg pivotally secured to the end of said extension bar and extending at an angle thereto, a handle, a ground engaging spike on said handle and a flexible member connecting said handle and said elongated bar whereby a fishing rod may be supported in said notch with the butt of said rod extending through said loop member.

References Cited in the file of this patent

UNITED STATES PATENTS

| | | |
|---|---|---|
| 494,092 | Whiting | Mar. 21, 1893 |
| 611,672 | Beecher | Oct. 4, 1898 |
| 1,091,491 | Ebur | Mar. 31, 1914 |
| 1,382,409 | Butler | June 21, 1921 |
| 1,674,493 | Adams | June 19, 1928 |
| 2,446,723 | Schaechterle | Aug. 10, 1948 |
| 2,466,166 | Fischer | Apr. 5, 1949 |
| 2,526,067 | Curtess | Oct. 17, 1950 |

FOREIGN PATENTS

| | | |
|---|---|---|
| 463,803 | Canada | Mar. 21, 1950 |